(12) United States Patent
Lila et al.

(10) Patent No.: US 11,172,699 B2
(45) Date of Patent: Nov. 16, 2021

(54) POLYPHENOL-PROTEIN COMPOSITIONS

(71) Applicants: NORTH CAROLINA STATE UNIVERSITY, Raleigh, NC (US); SINNOVATEK, INC., Raleigh, NC (US)

(72) Inventors: Mary Ann Lila, Kannapolis, NC (US); Josip Simunovic, Raleigh, NC (US); Michael Druga, Raleigh, NC (US); Amanda Vargochik, Raleigh, NC (US)

(73) Assignees: NORTH CAROLINA STATE UNIVERSITY, Raleigh, NC (US); SINNOVATEK, INC., Raleigh, NC (US)

( * ) Notice: Subject to any disclaimer, the term of this patent is extended or adjusted under 35 U.S.C. 154(b) by 323 days.

(21) Appl. No.: 16/471,269

(22) PCT Filed: Dec. 21, 2017

(86) PCT No.: PCT/US2017/067877
§ 371 (c)(1),
(2) Date: Jun. 19, 2019

(87) PCT Pub. No.: WO2018/119219
PCT Pub. Date: Jun. 28, 2018

(65) Prior Publication Data
US 2020/0029611 A1    Jan. 30, 2020

Related U.S. Application Data

(60) Provisional application No. 62/438,246, filed on Dec. 22, 2016.

(51) Int. Cl.
*A23L 33/105* (2016.01)
*A23L 33/17* (2016.01)

(52) U.S. Cl.
CPC ............. *A23L 33/105* (2016.08); *A23L 33/17* (2016.08)

(58) Field of Classification Search
CPC .............................. A23L 33/17; A23L 33/105
See application file for complete search history.

(56) References Cited

FOREIGN PATENT DOCUMENTS

| CN | 104305171 | | 1/2015 |
|---|---|---|---|
| JP | H02202900 | * | 8/1990 |
| JP | 2012-51840 | * | 3/2012 |
| WO | 2005/092121 | | 10/2005 |
| WO | WO2005092112 | * | 10/2005 |
| WO | 2009/016018 | | 2/2009 |

OTHER PUBLICATIONS

English Translation for CN104305171 published Jan. 2015.*

(Continued)

*Primary Examiner* — Anthony J Weier
(74) *Attorney, Agent, or Firm* — Myers Bigel, P.A.

(57) ABSTRACT

The invention relates to a composition having polyphenols, protein and a final moisture content of at least about 0.1% by weight and methods of making the same. In some aspects, a composition of the invention includes about 5% to about 40% polyphenols by weight and about 60% to about 90% protein by weight. In other aspects, methods of producing compositions including polyphenols and protein are provided.

9 Claims, 1 Drawing Sheet

(56) References Cited

OTHER PUBLICATIONS

English translation for JP2012-51840 published Mar. 2012.*
English Translation for JPH02202900 published Aug. 1990.*
International Search Report and Written Opinion corresponding to International Patent Application No. PCT/US2017/067877, dated Mar. 29, 2018, 8 pages.
International Preliminary Report on Patentability corresponding to International Patent Application No. PCT/US2017/067877, dated Jul. 4, 2019, 6 pages.

* cited by examiner

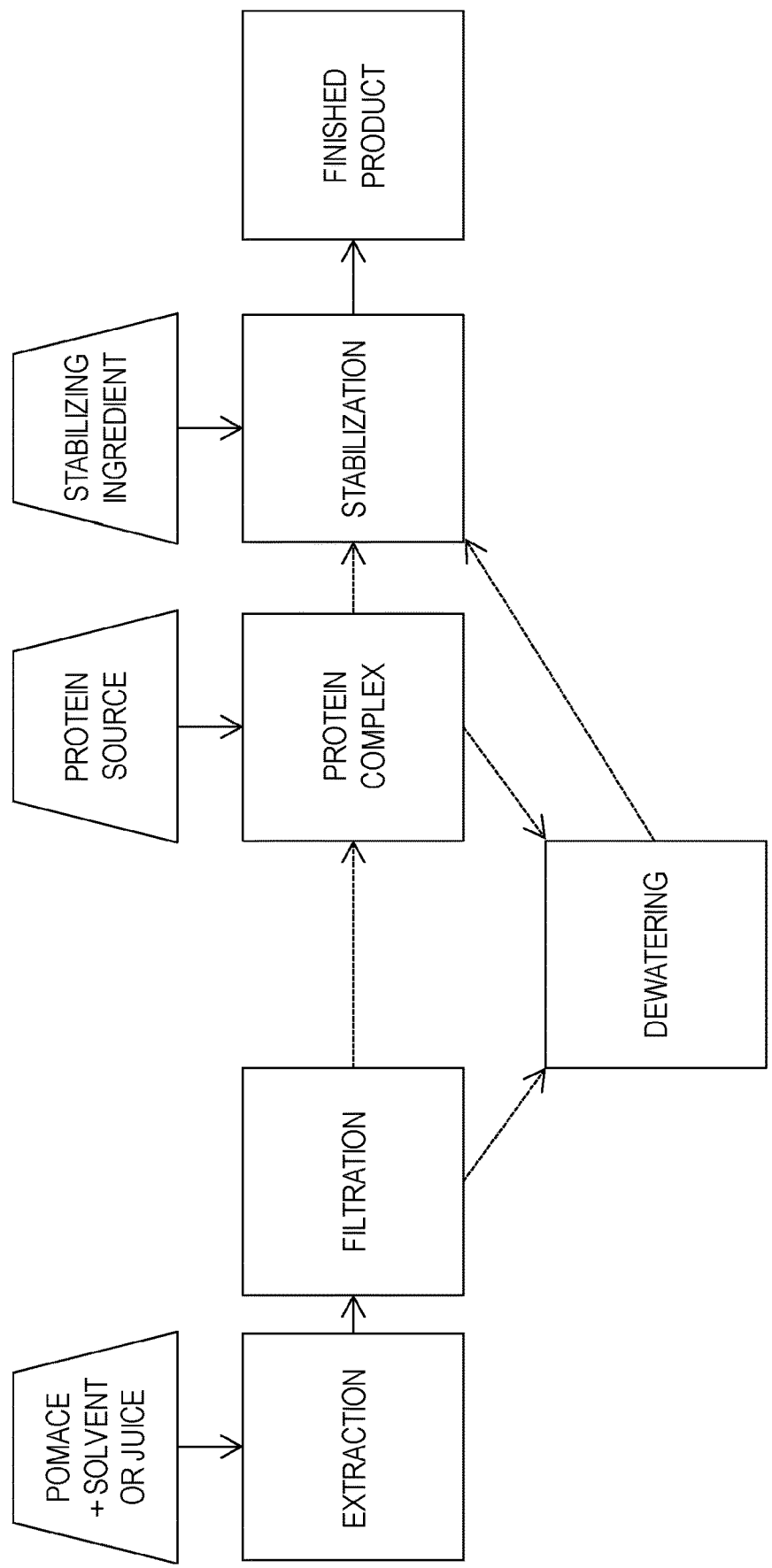

POLYPHENOL-PROTEIN COMPOSITIONS

STATEMENT OF PRIORITY

This application claims the benefit of U.S. Provisional Application No. 62/438,246, filed on Dec. 22, 2016, the disclosure of which is incorporated herein by reference in its entirety.

FIELD OF THE INVENTION

The invention relates to polyphenol-protein compositions and methods of making the same.

BACKGROUND OF THE INVENTION

Consumer demand for food products having higher nutrition and more natural ingredients is increasing. The nutritive and extra-nutritional compounds of interest for such food products include, for example, protein, vitamins, and phytoactive compounds. However, it has been difficult to obtain ingredients that have the same stability and functionality of artificial ingredients. To achieve products having natural ingredients with higher concentrations of the phytoactive compounds and protein, several complex formulation issues must be overcome. For example, proteins are notoriously difficult to incorporate at high levels into a product, especially when the product may undergo heat or freeze stress. Similarly, phytoactive and vitamin compounds that undergo heat stress may also be degraded. These issues demonstrate the difficulty of incorporating and stabilizing natural proteins, vitamins, and phytoactive compounds into products without artificial fortification.

SUMMARY OF THE INVENTION

One aspect of the invention provides a composition comprising polyphenols, protein and a final moisture content of at least about 0.1% by weight. In some aspect, a composition of the invention may comprise about 5% to about 40% polyphenols by weight, about 60% to 90% protein and/or a final moisture content of at least about 0.1% up to about 85%.

A second aspect provides a method of producing a composition comprising polyphenols and protein, the method comprising: extracting a plant tissue to produce a polyphenol extract; filtering the polyphenol extract to remove solids to produce a filtered polyphenol extract; adding the filtered polyphenol extract to a protein to produce a polyphenol-protein complex; and adjusting a moisture content of the polyphenol-protein complex to at least about 0.1% up to about 85% by weight.

A third aspect provides a method of producing a composition comprising polyphenols and protein, the method comprising: extracting a plant tissue to produce a polyphenol extract; filtering the polyphenol extract to remove solids to produce a filtered polyphenol extract; reducing a moisture content of the filtered polyphenol extract to produce a concentrated polyphenol extract; adding the concentrated polyphenol extract to a protein to produce a polyphenol-protein complex; and adjusting a moisture content of the polyphenol-protein complex to at least about 0.1% up to about 85% by weight.

A fourth aspect provides a method of producing a composition comprising polyphenols and protein, the method comprising: adding a polyphenol extract to a protein to produce a polyphenol-protein complex; and adjusting a moisture content of the polyphenol-protein complex to at least about 0.1% up to about 85% by weight.

A fifth aspect provides a method of producing a composition comprising polyphenols and protein, the method comprising: adding a concentrated polyphenol extract to a protein to produce a polyphenol-protein complex; and adjusting a moisture content of the polyphenol-protein complex to at least about 0.1% up to about 85% by weight.

These and other aspects of the invention are set forth in more detail in the description of the invention below.

BRIEF DESCRIPTION OF THE DRAWINGS

FIG. 1 provides a flow chart of example processes for producing the polyphenol-protein compositions of the present invention.

DETAILED DESCRIPTION

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as a dosage or time period and the like refers to variations of ±20%, ±10%, ±5%, ±1%, ±0.5%, or even ±0.1% of the specified amount.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

As used herein, the terms "increase," "increasing," "increased," "enhance," "enhanced," "enhancing," and "enhancement" (and grammatical variations thereof) describe an elevation of at least about 25%, 50%, 75%, 100%, 150%, 200%, 300%, 400%, 500% or more as compared to a control.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

The present invention is directed to polyphenol-protein compositions that comprise moisture. The polyphenol-protein compositions of the present invention may retain or have added moisture such that they are not in a dried or powdered form. The benefits of the liquid or semi-liquid form of the polyphenol-protein compositions of the present invention include being able to incorporate the polyphenol-protein compositions into a food product as a liquid or a semi-liquid rather than in a dried form. Some advantages to the food industry of a liquid or semi-liquid faun include reduction in non-uniform hydration, reduction in long batching times, reduced equipment demands, and reduced stress to the ingredient. The protein-polyphenol composition of the present invention may address the nutritional aspects and product attributes that are in demand while increasing processability, stability, and functionality for the food producer.

In some embodiments, the present invention provides a composition comprising polyphenols, protein and a final moisture content of at least about 0.1% by weight. In some embodiments, a composition of the present invention may comprise, consist essentially of, or consist of a final moisture content of at least about 0.1% up to about 85% by weight (e.g., about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85 percent weight (w/w), or any range or value therein). In some embodiments, a composition of the present invention may comprise, consist essentially of, or consist of a final moisture content of in the range of about 1% to about 85% by weight, about 5% to about 85% by weight, about 10% to about 85% by weight, about 15% to about 85% by weight, about 20% to about 85% by weight, about 25% to about 85% by weight, about 30% to about 85% weight, about 40% to about 85% by weight, about 50% to about 85% by weight, about 60% to about 85% by weight, about 20% to about 75% by weight, about 25% to about 75% by weight, about 30% to about 75% by weight, about 35% to about 75% by weight, about 40% to about 75% by weight, about 45% to about 75% by weight, about 55% to about 75% by weight, about 20% to about 50% by weight, about 25% to about 50% by weight, or about 30% to about 50% by weight, and the like.

"Moisture," as used herein refers to moisture that is present in the original sources of the protein and polyphenols when combined and/or "moisture" may also refer to added or removed water or ethanol.

In some embodiments, a composition of the present invention may comprise, consist essentially of, or consist of about 5% to about 40% polyphenols by weight (w/w) (e.g., about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40% by weight or any range or value therein). In some embodiments, a composition of the present invention may comprise, consist essentially of, or consist of polyphenols in the range of about 10% to about 40%, about 15% to about 40%, about 20% to about 40%, about 25% to about 40%, about 30% to about 40%, about 35% to about 40%, about 5% to about 35%, about 10% to about 35%, about 20% to about 35%, about 25% to about 35%, about 5% to about 30%, about 10% to about 30%, about 15% to about 30%, about 20% to about 30%, about 25% to about 30%, about 5% to about 25%, about 10% to about 25%, or about 15% to about 25% by weight, and the like.

In some embodiments, a composition of the present invention may comprise, consist essentially of, or consist of about 60% to about 90% protein by weight (w/w) (e.g., about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90% by weight or any range or value therein). In some embodiments, a composition of the present invention may comprise, consist essentially of, or consist of protein in the range of about 65% to about 90%, about 75% to about 90%, about 80% to about 90%, about 85% to about 90%, about 60% to about 85%, about 65% to about 85%, about 70% to about 85%, about 75% to about 85%, about 60% to about 80%, about 65% to about 80%, about 70% to about 80%, about 60% to about 75%, about 65% to about 75%, about 60% to about 70% by weight, and the like.

In some embodiments, the present invention may be a complexation of a concentrated protein source and a phytochemical extract having a final moisture content of at least 0.1% by weight. In some embodiments, the composition of the present invention may be prepared as a combination of concentrated protein and concentrated polyphenols. In some embodiments, the composition of the present invention may be prepared by combining the protein and polyphenol sources and subsequently concentrating the composition. In some embodiments, the polyphenols may be concentrated and then mixed with a protein source.

In some embodiments, a composition of the invention comprising polyphenols and protein may be prepared by reducing an initial moisture content of the composition to provide the final moisture content. In some embodiments, a composition of the invention comprising polyphenols and protein may be prepared by increasing an initial moisture content of the composition to provide the final moisture content. In some embodiments, a composition of the invention comprising polyphenols and protein may be prepared by increasing an initial moisture content of the composition and then subsequently reducing the resulting moisture content to provide the final moisture content of the composition. In some embodiments, a composition of the invention comprising polyphenols and protein may be prepared by reducing an initial moisture content of the composition and then subsequently increasing the resulting moisture content to provide the final moisture content of the composition.

As used herein, "initial moisture content" means the moisture content of the each of the polyphenol and protein sources prior to combining as well as the moisture content of the polyphenol and protein sources when combined (the polyphenol-protein complex) but prior to any reduction (concentrating or dewatering) or addition of moisture to the polyphenol-protein complex.

As used herein, "final moisture content" means the moisture content of a composition of the invention that is achieved after the polyphenols and protein are combined (e.g., the polyphenol-protein complex). A final moisture content may be achieved through an addition of moisture, a reduction of moisture, or by maintaining an initial moisture content of a combined polyphenol-protein complex. In some embodiments, an initial moisture content may be equivalent to the final moisture content of a polyphenol-protein complex.

As used herein, the term "phenolic" or "phenolics" refers to a group of related compounds that include, but are not limited to, phenolic acids and analogues (e.g., hydroxybenzoic acids (e.g., gallic acid, p-hydroxybenzoic acid, protocatechuic acid, vanillic acid, and syringic acid) and hydroxycinnamic acids (e.g., ferulic acid, caffeic acid, p-coumaric acid, chlorogenic acid, and sinapic acid), flavonoids (e.g. flavones, flavanols, flavanones, flavonols isoflavones, anthocyanins), tannins, stilbenes, curcuminoids, coumarins (e.g., hydroxylcoumarins, furocoumarins and isofurocoumarin, pyranocoumarins, bicoumarins, dihydro-isocoumarins), lignans, quinones (anthraquinones, phenanthraquinones, naphthoquinones, and benzoquinones). Phenolic compounds are generally understood to be bioactive having, for example, antioxidant, anticarcinogenic, antimutagenic and anti-inflammatory properties.

In some embodiments, any plant material may be used as sources of polyphenols. In some embodiments, polyphenols may be obtained from sources that include, but are not limited to, fruits (e.g., berries, pomes, drupes, and the like), leaves (e.g., purple leaf lettuce, spinach, kale, and the like), juices, pomace, seeds, roots (e.g., sweet potato), and the like. In some embodiments, the polyphenols may be obtained from algae and/or fungi.

In some embodiments, the sorption (i.e., absorption/adsorbtion; capture and concentration of mid-polarity phytochemical constituent in the protein matrix) may be achieved when the starting protein source comprises a protein content of at least about 30% protein. In some embodiments, the protein content of a protein source may be naturally occurring or it may be the result of concentrating the proteins in the protein source. In some embodiments, a protein for a composition of the present invention may be obtained from any protein source comprising a protein content (naturally occurring or concentrated) of at least about 30% protein (e.g., at least about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% protein, or any range or value therein). In some embodiments, a protein for a composition of the present invention may be obtained from any protein source comprising protein in a range from about 30% to about 95%, about 40% to about 95%, about 45% to about 95%, about 50% to about 95%, about 60% to about 95%, about 70% to about 95%, about 80% to about 95%, about 90% to about 95%, 30% to about 90%, about 40% to about 90%, about 50% to about 90%, about 60% to about 90%, about 70% to about 90%, about 80% to about 90%, about 40% to about 85%, about 45% to about 85%, about 50% to about 85%, about 55% to about 85%, about 60% to about 85%, about 65% to about 85%, about 70% to about 85%, about 75% to about 85%, about 30% to about 50%, about 30% to about 55%, about 30% to about 60%, about 30% to about 65%, about 30% to about 70%, and the like). In some embodiments, a protein for a composition of the present invention may be obtained from any protein source comprising a protein content (naturally occurring or concentrated) in the range of about 50-90% high protein matrices. In some embodiments, 50-90% high protein matrices may be the most efficient for sorption of polyphenols, that is the polyphenols may be sorbed to a higher concentrations than when using protein sources having low percentage protein.

In some embodiments, a protein source may be whey or egg (e.g., albumin). In some embodiments, a protein source may be a plant based protein (e.g., pea, rice, hemp, soy (e.g., defatted soy flour, soy protein isolate), *Atriplex* spp., peanut, chickpea (i.e., garbanzo bean), sweet potato, oat (e.g., high protein oat flour), wheat).

In some embodiments, a composition of the invention comprising polyphenols and protein may comprise additional ingredient(s) including, but not limited to, acidulants and stabilizers. In some embodiments, a composition comprising polyphenols and protein may comprise one or more acidulants. In some embodiments, a composition comprising polyphenols and protein may comprise one or more acidulants in an amount of about 0.01% to about 10% by weight of the composition (w/w) (e.g., about 0.1, 0.2, 0.3, 0.4, 0.5, 0.6, 0.7, 0.8, 0.9, 1, 2, 3, 4, 5, 6, 7, 8, 9, 10% or any range or value therein).

In some embodiments, an acidulant useful with this invention may be a food grade GRAS (generally recognized as safe) acidulant. In some embodiments, a food grade GRAS acidulant may be citric acid, acetic acid, ascorbic acid, lactic acid, succinic acid, propionic acid, malic acid, fumaric acid, amino acids, and salts and derivatives thereof, and the like.

In some embodiments, a composition of the invention comprising polyphenols and protein may comprise one or more stabilizers including, but not limited to, oligosaccharides, sugar alcohols (e.g., mannitol, sorbitol, glycerol, and the like), gum arabic, pectin, salt and/or metal ions (e.g., potassium chloride, sodium chloride, and zinc chloride, and the like). In some embodiments, an oligosaccharide useful with this invention may include, but is not limited to, trehalose, sucrose, inulin, or any combination thereof. In some embodiments, the one or more oligosaccharides may be present in the composition of the present invention in an amount from about 0.1% to about 30% by weight (w/w) (e.g., about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30% by weight, or any range or value therein). In some embodiments, one or more oligosaccharides may be present in the composition of the present invention in a range from about 0.1% to about 1%, about 0.5% to about 1%, about 0.5% to about 5%, about 0.5% to about 10%, about 0.5% to about 15%, about 0.5% to about 20%, about 0.5% to about 30%, about 1% to about 5%, about 1% to about 10%, about 1% to about 20%, about 1% to about 30%, about 5% to about 30%, about 10% to about 30%, about 15% to about 30%, about 20% to about 30%, about 0.5% to about 25%, about 1% to about 25%, about 5% to about 25%, about 10% to about 25%, about 15% to about 25%, about 20% to about 25%, and the like.

In some embodiments, a composition of the invention comprising polyphenols, protein and a final moisture content of at least about 0.1% by weight may be pasteurized for the purpose of, for example, eliminating or reducing microbes in the composition. In some embodiments, a composition of the invention may be heated to a temperature of at least about 50° C. In some embodiments, a composition of the invention may be heated to a temperature of at least about 50° C. up to about 150° C. (e.g. about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150° C., or any range or value therein) to produce a pasteurized composition comprising polyphenols, protein and a final moisture content of at least about 0.1% by weight.

In some embodiments, a composition of the present invention may be heated in batches, which typically requires several hours of heating per batch. In some embodiments, a composition of the present invention may be heated using a continuous flow process, wherein the composition is flowed through, for example, a pipe during the heating process. A continuous flow heating process typically requires less time for heating to achieve pasteurization than a batch process. In some embodiments, heating of a composition of the present invention using continuous flow may be for at least about 0.1 second to about 10 minutes (e.g., about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 70, 80, 90, 100, 110, 120, 130, 140, 150, 160, 170, 180, 190, 200, 225, 250, 275, 300, 325, 350, 375, 400, 425, 450, 475, 500, 525, 550, 575, 600 seconds, or any range or value therein; e.g., about 0.1, 0.2, 0.3, 0.4, 0.5, 0.6, 0.7, 0.8, 0.9, 1, 2, 3, 4, 5, 6, 7, 8, 9, 10 minutes or any range or value therein). In some embodiments, heating of a composition of the present invention using continuous flow may be in a range of about 10 seconds to about 5 minutes, about 10 seconds to about 10 minutes, about 30 seconds to about 10 minutes, about 30 seconds to about 5 minutes, about 1 minute to about 3 minutes, about 1 minute to about 5 minutes, about 1 minute to about 7 minutes, about 1 minute to about 10 minutes, about 2 minutes to about 3 minutes, about 2 minutes to about 5 minutes, about 2 minutes to about 7 minutes, about 2 minutes to about 10 minutes, about 5 minutes to about 6 minutes, about 5 minutes to about 7 minutes, about 5 minutes to about 8 minutes, about 5 minutes to about 9 minutes, about 5 minutes to about 10 minutes, about 7 minutes to about 8 minutes, about 7 minutes to about 9 minutes, about 7 minutes to about 10 minutes, about 8 minutes to about 10 minutes, and the like.

A composition of the present invention may be a concentrated liquid complex having nutritional attributes of both protein and polyphenols. Due to the complexation of the proteins and polyphenols, these ingredients are more stable and more functional than either would be as a separate unit. A liquid form is easier to incorporate into products on a production scale, which further creates production efficiencies in simplicity of batching. In some embodiments, a composition of the present invention may serve as a natural coloring agent and may also lend flavor compounds depending upon the extracted material. In some embodiments, a composition of the invention may be less likely to destabilize due to the strong complex of protein and polyphenols that can resist normal mechanisms of protein denaturation such as oxidation. In some embodiments, further functionality may also result such as reduced bar hardening, color stability, and foam stability.

In some embodiments, the present invention provides stable compositions having high concentrations of polyphenols and protein and a final moisture content of at least about 0.1% by weight that may be used for any product application in which high concentrations of polyphenols and protein are desirable. In some embodiments, a composition of the invention is in a liquid format amenable for incorporation into a wide range of products including, but not limited to, hypoallergenic food products, and high protein phytoactive-enriched convenience products (e.g., bars, power bars).

The present invention additionally provides methods of preparing a composition of the invention comprising polyphenols, protein and a final moisture content of at least about 0.1% by weight (e.g., FIG. 1). In some embodiments, the present invention provides a method of producing a composition comprising polyphenols and protein, comprising: extracting a plant tissue to produce a polyphenol extract; filtering the polyphenol extract to remove solids to produce a filtered polyphenol extract; adding the filtered polyphenol extract to a protein to produce a polyphenol-protein complex; and adjusting a moisture content of the polyphenol-protein complex to at least about 0.1% up to about 85% by weight.

In some embodiments, the present invention provides a method of producing a composition comprising polyphenols and protein, comprising: extracting a plant tissue to produce a polyphenol extract; filtering the polyphenol extract to remove solids to produce a filtered polyphenol extract; reducing a moisture content of the filtered polyphenol extract to produce a concentrated polyphenol extract; adding the concentrated polyphenol extract to a protein to produce a polyphenol-protein complex; and adjusting a moisture content of the polyphenol-protein complex to at least about 0.1% up to about 85% by weight.

In some embodiments, the present invention provides a method of producing a composition comprising polyphenols and protein, comprising: adding a polyphenol extract (without concentration) to a protein to produce a polyphenol-protein complex; and adjusting a moisture content of the polyphenol-protein complex to at least about 0.1% to about 85% by weight.

In some embodiments, the present invention provides a method of producing a composition comprising polyphenols and protein, comprising: adding a concentrated polyphenol extract to a protein to produce a polyphenol-protein complex; and adjusting a moisture content of the polyphenol-protein complex to at least about 0.1% up to about 85% by weight.

Methods of extracting polyphenols are known and any such method may be used to extract polyphenols useful with the present invention. In some embodiments, a method of extracting polyphenols can include, but is not limited to, emerging electric or electromagnetic extraction methods (e.g., microwave, pulse electric field (PEF), radio frequency (RF), ohmic, and the like), wherein the bioactive component is removed from or drawn out of the source material. Any method of filtering or separating the source material from the polyphenols may be used with the present invention to separate a liquid polyphenol extract from the solids.

In some embodiments, protein content of the protein that is added to the polyphenol at least about 30% protein. In some embodiments, the protein content of a protein source may be naturally occurring or it may be the result of concentrating the proteins in the protein source. In some embodiments, a protein for a composition of the present invention may be obtained from any protein source comprising a protein content (naturally occurring or concentrated) of at least about 30% protein (e.g., at least about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% protein, or any range or value therein). In some embodiments, the protein content of the protein source that is added to the polyphenol is 50% to 90% protein.

In some embodiments, a polyphenol-protein complex of the present invention having at least about 0.1% up to about 85% by weight may comprise, consist essentially of, or consist of about 5% to about 40% polyphenols by weight (e.g., about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40% by weight or any range or value therein). In some embodiments, a polyphenol-protein complex of the present invention may comprise, consist essentially of, or consist of polyphenols in the range of about 10% to about 40%, about 15% to about 40%, about 20% to about 40%, about 25% to about 40%, about 30% to about 40%, about 35% to about 40%, about 5% to about 35%, about 10% to about 35%, about 20% to about 35%, about 25% to about 35%, about 5% to about 30%, about 10% to about 30%, about 15% to about 30%, about 20% to about 30%, about 25% to about 30%, about 5% to about 25%, about 10% to about 25%, or about 15% to about 25% by weight, and the like.

In some embodiments, a polyphenol-protein complex of the present invention having at least about 0.1% up to about 85% by weight may comprise, consist essentially of, or consist of about 60% to about 90% protein by weight (e.g., about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90% by weight or any range or value therein). In some embodiments, a polyphenol-protein complex of the present invention having at least about 0.1% up to about 85% by weight may comprise, consist essentially of, or consist of protein in the range of about 65% to about 90%, about 75% to about 90%, about 80% to about 90%, about 85% to about 90%, about 60% to about 85%, about 65% to about 85%, about 70% to about 85%, about 75% to about 85%, about 60% to about 80%, about 65% to about 80%, about 70% to about 80%, about 60% to about 75%, about 65% to about 75%, about 60% to about 70% by weight, and the like.

In some embodiments, a method of producing a composition of the invention may further comprise adding one or more acidulants and/or one or more stabilizers (e.g., oligosaccharides). In some embodiments, one or more acidulants and/or one or more stabilizers may be added to the polyphenol extract prior to or at the same time as the polyphenol extract is added to the protein. In some embodiments, one or more acidulants may be added to the polyphenol-protein complex prior to adjusting the moisture content.

In some embodiments, one or more acidulants may be added in an amount of about 0.01% to about 10% by weight of the composition (e.g., about 0.1, 0.2, 0.3, 0.4, 0.5, 0.6, 0.7, 0.8, 0.9, 1, 2, 3, 4, 5, 6, 7, 8, 9, 10% or any range or value therein). In some embodiments, one or more stabilizers (e.g., oligosaccharides) may be added in an amount from about 0.1% to about 30% by weight (e.g., about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30% by weight, or any range or value therein).

In some embodiments, a polyphenol-protein complex of the invention comprising a moisture content of at least about 0.1% up to about 85% by weight may be heated to a temperature of at least about 50° C. In some embodiments, a polyphenol-protein complex of the invention comprising a moisture content of at least about 0.1% up to about 85% by weight may be heated to a temperature of at least about 50° C. to about 150° C. In some embodiments, a polyphenol-protein complex may be heated in batches. In some embodiments, a polyphenol-protein complex may be heated using a continuous flow process. In some embodiments, a polyphenol-protein complex may be heated for at least about 0.1 second to about 10 minutes.

In some embodiments, the step of adjusting the moisture content comprises reducing the moisture content. In some embodiments, the step of adjusting the moisture content comprises increasing the moisture content. In some embodiments, the step of adjusting the moisture content comprises reducing the moisture content and then subsequently increasing the moisture content. In some embodiments, the step of adjusting the moisture content comprises increasing the moisture content and then subsequently reducing the moisture content.

Any known process for reducing moisture (e.g., dewatering, concentrating) from a substance may be used with the methods of the present invention. In some embodiments, reducing the moisture content of a composition of the present invention may comprise microwave assisted concentration. In some embodiments, reducing the moisture content of a composition of the present invention may comprise reduced pressure (vacuum).

Microwave assisted concentration may be implemented in a batch mode using a microwave heated vessel wherein the dewatering temperature can be controlled and maintained at an atmospheric boiling point via releasing the evaporated water into the atmosphere or condensation and liquefaction at a downstream location.

In some embodiments, evaporation can be performed under reduced pressure (vacuum), which may increase the efficiency of moisture removal and reduce the boiling point of the mixture. In some embodiments, a thermo-sensitive composition may benefit from a reduced boiling point.

In some embodiments, microwave heated kettles can be used for the batch mode of evaporation/dewatering.

In some embodiments, dewatering or concentration may comprise a continuous flow/recirculation process using flow-through/continuous flow microwave heating (see, e.g., cylindrical microwave applicators; continuous flow/travelling wave microwave processing devices; and/or modular continuous flow processing systems comprising small capacity microwave generators/magnetrons). In some embodiments, a dewatering/evaporation temperature in a continuous flow process may be controlled and maintained at an atmospheric boiling point via releasing the evaporated water into the atmosphere or condensation and liquefaction at a downstream location. In some embodiments, evaporation can be performed under reduced pressure (vacuum), which may increase the efficiency of moisture removal and reduce the boiling point of the mixture. In some embodiments, a thermo-sensitive composition may benefit from a reduced boiling point.

In some embodiments, the vapors generated under both atmospheric and reduced pressure/vacuum implemented processes may be subjected to downstream vapor/flavor recuperation prior to the final water vapor condensation/liquid capture or release.

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLE

Example 1

In this process, polyphenol-rich extracts are combined with a protein source to form a complex that is a more stable and usable form of both separate individual ingredients. Blueberry Pomace was extracted using a 50% ethanol solution (2:3 w/v) in a rapid continuous flow condition. The extract was then separated from the spent biomass and evaporatively concentrated using a rotovapor. That extract was then pH standardized using citric acid. The extract was then complexed to brown rice protein isolate and standardized to a final pH of 3.5.

The complex was then thermally processed using a continuous flow microwave processing system. One set of complexes was thermally processed at 73° C. to yield a 90 day refrigerated shelf life. A second set was thermally processed at 85° C. to yield a shelf stable complex. The complexed product performed well under thermal processing conditions. There was no sediment or fouling on any of the thermal processing surfaces. The resulting product was smooth, intact, and retained the color of the unprocessed product.

The resulting product at both low and high temperature processing were also able to maintain their quality parameters through 5 freeze thaw stress cycles. The product was also incorporated into a smoothie product, carrying the color, polyphenols, and protein of the complex through to the finished product.

The foregoing is illustrative of the present invention, and is not to be construed as limiting thereof. The invention is defined by the following claims, with equivalents of the claims to be included therein.

That which is claimed is:

1. A composition comprising about 5% to about 40% polyphenols by weight, about 60% to about 90% protein by weight and a final moisture content of at least 0.1% by weight.

2. The composition of claim 1, wherein the final moisture content is about 0.1% up to about 85% by weight.

3. The composition of claim 1, wherein the composition is a pasteurized composition.

4. The composition of claim 1, wherein the composition comprises one or more acidulants.

5. The composition of claim 4, wherein the one or more acidulants is a food grade GRAS (generally recognized as safe) acidulant or a combination of food grade GRAS acidulants.

6. The composition of claim 5, wherein the food grade GRAS acidulant is citric acid, acetic acid, ascorbic acid, lactic acid, or any combination thereof.

7. The composition of claim 1, wherein the composition comprises one or more oligosaccharides.

8. The composition of claim 7, wherein the one or more oligosaccharides is present in an amount of from about 0.1% to about 30% by weight.

9. The composition of claim 7, wherein the one or more oligosaccharides are trehalose, sucrose, or any combination thereof.

\* \* \* \* \*